(12) United States Patent
Martinez de Velasco Cortina et al.

(10) Patent No.: US 10,769,510 B2
(45) Date of Patent: Sep. 8, 2020

(54) UNIVERSAL TRANSPONDER

(71) Applicant: Neology, Inc., San Diego, CA (US)

(72) Inventors: Francisco Martinez de Velasco Cortina, San Diego, CA (US); Joe Mullis, San Diego, CA (US); Manfred Rietzler, San Diego, CA (US); Sheshi Nyalamadugu, San Diego, CA (US); Rodolfo Monsalvo, San Diego, CA (US)

(73) Assignee: NEOLOGY, INC., San Diego, CA (US)

( * ) Notice: Subject to any disclaimer, the term of this patent is extended or adjusted under 35 U.S.C. 154(b) by 0 days.

(21) Appl. No.: 16/134,779

(22) Filed: Sep. 18, 2018

(65) Prior Publication Data
US 2019/0034775 A1    Jan. 31, 2019

Related U.S. Application Data

(63) Continuation of application No. 14/684,289, filed on Apr. 10, 2015, now Pat. No. 10,083,385, which is a (Continued)

(51) Int. Cl.
*G06K 5/00* (2006.01)
*G06K 19/06* (2006.01)
(Continued)

(52) U.S. Cl.
CPC ..... *G06K 19/0723* (2013.01); *G06K 19/0724* (2013.01); *G06Q 20/28* (2013.01);
(Continued)

(58) Field of Classification Search
USPC ............ 235/375, 380–382.5, 451, 492
See application file for complete search history.

(56) References Cited

U.S. PATENT DOCUMENTS

| 5,464,011 A | 11/1995 | Bridge |
| 5,940,006 A | 8/1999 | Maclellan |

(Continued)

FOREIGN PATENT DOCUMENTS

| JP | 5464011 B2 | 4/2014 |
| KR | 1020110116886 A | 10/2011 |

(Continued)

OTHER PUBLICATIONS

Extended European Search Report for EP16777505.5 dated Sep. 26, 2018, (7 pages).
(Continued)

*Primary Examiner* — Tuyen K Vo
(74) *Attorney, Agent, or Firm* — Procopio, Cory, Hargreaves & Savitch LLP; Mark W. Catanese

(57) ABSTRACT

An account is managed using information read from a dual frequency transponder. Information stored on the dual frequency transponder can be read by a NFC-enabled device and by a UHF RFID reader. The information links, corresponds, or otherwise provides access to account information stored at a remote server. For example, a NFC-enabled device can read the information from the dual frequency transponder and use that information to enable instant and on-the-spot recharging of a toll account. In addition, a UHF RFID toll reader can scan information from the dual frequency transponder and use that information to debit toll charges from the correct toll account. The dual frequency transponder can be embedded in a license plate and read using a reader placed in the road. Additionally, the transponder can be configured to function at the correct frequency only when a valid vehicle registration sticker is applied to the license plate.

18 Claims, 12 Drawing Sheets

Related U.S. Application Data continuation-in-part of application No. 14/459,299, filed on Aug. 13, 2014, now Pat. No. 9,355,398.

(60) Provisional application No. 61/978,167, filed on Apr. 10, 2014, provisional application No. 61/865,600, filed on Aug. 13, 2013.

(51) Int. Cl.
| | | |
|---|---|---|
| *G06K 19/07* | (2006.01) | |
| *G06Q 20/28* | (2012.01) | |
| *G06Q 50/30* | (2012.01) | |
| *G07B 15/06* | (2011.01) | |
| *G06Q 20/32* | (2012.01) | |
| *G06Q 20/34* | (2012.01) | |
| *G06Q 20/36* | (2012.01) | |
| *G06K 19/077* | (2006.01) | |

(52) U.S. Cl.
CPC ........... *G06Q 50/30* (2013.01); *G07B 15/063* (2013.01); *G06K 19/07794* (2013.01); *G06Q 20/3227* (2013.01); *G06Q 20/3278* (2013.01); *G06Q 20/342* (2013.01); *G06Q 20/349* (2013.01); *G06Q 20/352* (2013.01); *G06Q 20/363* (2013.01)

(56) References Cited

U.S. PATENT DOCUMENTS

| | | |
|---|---|---|
| 6,259,367 B1 | 7/2001 | Klein |
| 6,653,946 B1 | 11/2003 | Hassett |
| 8,095,154 B1 | 1/2012 | Wang et al. |
| 2004/0089707 A1 | 5/2004 | Cortina et al. |
| 2005/0010478 A1 | 1/2005 | Gravelle |
| 2005/0187882 A1* | 8/2005 | Sovio ..................... G06Q 20/20 705/64 |
| 2005/0222961 A1 | 10/2005 | Staib et al. |
| 2005/0289061 A1 | 12/2005 | Kulakowski et al. |
| 2006/0229978 A1 | 10/2006 | Popovic et al. |
| 2006/0278704 A1 | 12/2006 | Saunders et al. |
| 2007/0176779 A1 | 8/2007 | Braunstein |
| 2007/0285256 A1 | 12/2007 | Batra |
| 2008/0084275 A1 | 4/2008 | Azevedo et al. |
| 2008/0126929 A1 | 5/2008 | Bykov |
| 2008/0314971 A1 | 12/2008 | Faith et al. |
| 2009/0021379 A1 | 1/2009 | Zhu |
| 2009/0174365 A1 | 7/2009 | Lowenthal |
| 2009/0262716 A1 | 10/2009 | Kawakami |
| 2010/0112964 A1* | 5/2010 | Yi ......................... G04G 9/0064 455/90.3 |
| 2012/0019363 A1 | 1/2012 | Fein |
| 2012/0024947 A1* | 2/2012 | Naelon .................. G06Q 30/06 235/380 |
| 2012/0111950 A1* | 5/2012 | Worrall ............ G06K 19/07762 235/488 |
| 2012/0323767 A1 | 12/2012 | Michael |
| 2013/0103519 A1 | 4/2013 | Kountosis |
| 2013/0119135 A1 | 5/2013 | Gauthier et al. |
| 2013/0332353 A1* | 12/2013 | Aidasani ............ G06K 19/0718 705/41 |
| 2014/0232518 A1 | 8/2014 | Stoehr |
| 2015/0039494 A1 | 2/2015 | Sinton et al. |
| 2015/0048159 A1 | 2/2015 | Martinez De Velasco Cortina |
| 2015/0135336 A1 | 5/2015 | Arasavelli et al. |

FOREIGN PATENT DOCUMENTS

| | | |
|---|---|---|
| WO | 2011146492 A2 | 1/2011 |
| WO | 2011146492 A2 | 11/2011 |

OTHER PUBLICATIONS

International Search Report and Written Option for PCT/US2014050973, dated Oct. 29, 2014, (6 pages).

Extended European Search Report for EP 14836230.4, dated Jan. 4 2017, (7 pages).

Office Action and Exam Report for EP16777505.5 dated May 14, 2019, (4 pages).

Office Action and Exam Report for EP14836230.4 dated Jul. 2, 2019, (6 pages).

* cited by examiner

UNIVERSAL TRANSPONDER

RELATED APPLICATION INFORMATION

This patent application is a continuation of co-pending U.S. patent application Ser. No. 14/684,289, entitled "UNIVERSAL TRANSPONDER," filed Apr. 10, 2015, which is a continuation-in-part of U.S. patent application Ser. No. 14/459,299, entitled "SYSTEMS AND METHODS FOR MANAGING AN ACCOUNT," filed on Aug. 13, 2014, now U.S. Pat. No. 9,355,398, which claims the benefit under 35 U.S.C. § 119(e) to U.S. Provisional Application No. 61/865,600, filed Aug. 13, 2013, each of which is incorporated herein by reference in its entirety. This patent application is a continuation of co-pending U.S. patent application Ser. No. 14/684,289, entitled "UNIVERSAL TRANSPONDER," filed Apr. 10, 2015, which also claims the benefit under 35 U.S.C. § 119(e) to U.S. Provisional Application No. 61/978,167, filed Apr. 10, 2014, which is also incorporated herein by reference in its entirety.

BACKGROUND

1. Technical Field

The embodiments described herein are related to Radio Frequency Identification (RFID) Applications, and more specifically to applications that allow for improved management and recharging of prepaid accounts.

2. Related Art

RFID is a technology that allows companies to develop applications in a variety of areas. At its core, RFID is a technology that allows for the identification of objects or people and to communicate information related to associated objects or people. Some of the major areas that RFID is enabling new applications include asset tracking, companies can put RFID tags on assets that are lost or stolen often, that are underutilized or that are just hard to locate at the time they are needed; manufacturing, RFID has been used in manufacturing plants for more than a decade. It's used to track parts and work in process and to reduce defects, increase throughput and manage the production of different versions of the same product; supply chain management, RFID technology has been used in closed loop supply chains or to automate parts of the supply chain within a company's control for years; payment systems, one of the most popular uses of RFID today is to pay for road tolls without stopping; and security and access control, RFID has long been used as an electronic key to control who has access to office buildings or areas within office buildings. There are also numerous other types of applications such as animal or human tracking and identification, electronic passports, border crossing, library applications, An RFID system comprises one or more tags or transponders that are somehow associated with an object or objects, and one or more readers or interrogators configured to read information out of the tag. The reader reads information by broadcasting a Radio Frequency (RF) signal over certain range. When a tag is within range of the reader and receives the signal, it can reflect that signal back to the reader in order to communicate with the reader. In order to communicate, the reader may put certain commands on the RF signal, and the tag can respond by putting information stored in the tag onto the signal that is reflected back to the reader.

RFID systems can employ various types of technology including active technology, semi-active technology and passive technology. Active and semi-active systems include a battery within the tag. In passive systems, no battery is included in the tag. Rather, the tag receives all the energy it needs from the received RF signal. Because passive tags do not include a battery, they can be made smaller, are less expensive than active or semi-active tags, and can also provide much more flexibility to design tags to meet various application and environmental requirements. While passive tags typically cannot communicate over as long a distance, the size, cost, and flexibility provided by passive tags make them much more attractive for many applications.

RFID systems can also operate over many frequency ranges and in accordance with several communication protocols. A couple of the most common frequency ranges are the High Frequency (HF) band (13.56 MHz) and Ultra-High Frequency (UHF) band (865-928 MHz). HF systems can operate over shorter ranges, e.g., 10 cm-1 m, and at lower data rates, whereas the UHF systems can operate over longer ranges 1-12 m, and at higher data rates.

Near Field Communication (NFC) systems are examples of HF systems. NFC is a set of standards for smartphones and similar devices to establish radio communication with each other by touching them together or bringing them into proximity, usually no more than a few inches. Present and anticipated applications include contactless transactions, data exchange, and simplified setup of more complex communications such as Wi-Fi. Communication is also possible between an NFC device and an unpowered NFC chip in a tag.

NFC standards cover communications protocols and data exchange formats, and are based on existing radio-frequency identification (RFID) standards including ISO/IEC 14443 and FeliCa. The standards include ISO/IEC 18092[4] and those defined by the NFC Forum, which was founded in 2004 by Nokia, Philips and Sony, and now has more than 160 members. The Forum also promotes NFC and certifies device compliance. It fits the criteria for being considered a personal area network.

NFC builds upon RFID systems by allowing two-way communication between endpoints, where earlier systems such as contact-less smartcards were one-way only. NFC devices can also be used in contactless payment systems, similar to those currently used in credit cards and electronic ticket smartcards, and allow mobile payment to replace or supplement these systems. For example, Google Wallet allows consumers to store credit card and store loyalty card information in a virtual wallet and then use an NFC-enabled device at terminals that accepts, for example, MasterCard PayPass transactions. The NFC Forum also promotes the potential for NFC-enabled devices to act as electronic identity documents and keycards. As NFC has a shorter range and supports encryption, it is generally better suited than earlier, less private RFID systems for exchanging sensitive data such as personal finance and identification.

While there are many uses for HF technologies such as NFC, UHF technologies typically support longer range communication and higher data rates. Thus, UHF technology tends to excel in applications that include but is not limited to tolling and electronic vehicle registration, asset supervision, and supply chain management.

SUMMARY

A RFID system comprising a dual frequency RFID transponder.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1A:
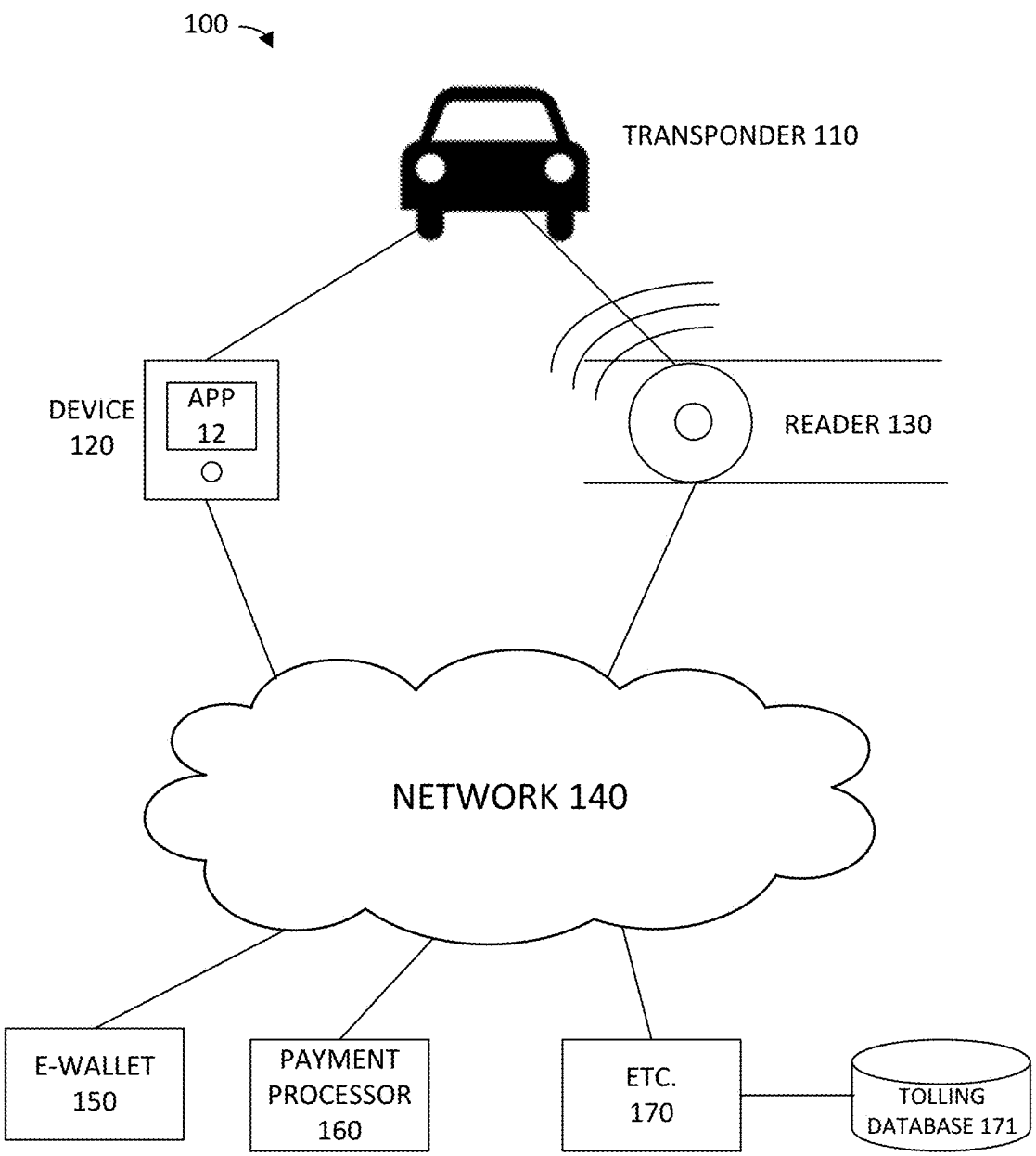
FIG. 1A illustrates an embodiment of a system in which an account is managed.

The embodiments disclosed herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these example embodiments, or any other implementations, may be referred to as techniques. In general, the order of the steps of disclosed processes may be altered. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of operation. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the systems and methods described herein are directed toward applications for a multi-frequency transponder. In particular, the various embodiments of the systems and methods described herein are directed toward applications for a dual frequency transponder that incorporates both UHF and HF capabilities, and is therefore able to operate over both the UHF band (e.g., 865-928 MHz) and the HF band (e.g., 13.56 MHz).

U.S. Provisional Patent Application Ser. No. 61/811,649, entitled 'Systems and Methods for Connecting People with Product Information," filed Apr. 12, 2013, describes one application for a dual frequency transponder. Meanwhile, the various embodiments of the systems and methods described herein are directed toward applying the dual frequency transponder to streamline electronic prepayment routines and practices. In particular, in various embodiments, a dual frequency transponder is used to enable immediate and on-the-spot prepayment of road tolls enforced through Electronic Toll Collection (ETC) systems. Although embodiments of the systems and methods described herein are with respect to applications for a dual frequency transponder in electronic toll collection, it is to be understood that there are numerous other possible applications of a dual frequency transponder. For example, other applications for a dual frequency transponder include but are not limited to parking access, customs and border control, and electronic vehicle registration (EVR).

ETC systems eliminate traffic delays on toll roads by automating toll collection and obviating protracted stops at manual toll booths. Although a few ETC systems allows toll charges to be postpaid (i.e., billed to users periodically and/or a later date), by far the most common ETC billing mechanism is to automatically deduct the toll charges from prepaid debit accounts. Generally, an ETC system must first identify a passing vehicle before it can electronically debit the account of registered vehicle owner. For vehicle identification, most ETC systems operating today (e.g., E-ZPass®) rely on RFID technology. More specifically, most ETC systems issue RFID transponders or tags that are then registered or activated to link to specific vehicle owner accounts. For instance, in order for a user, Alice, to gain access to an ETC service, she will initially have to set up a toll account with an appropriate transit or toll authority (e.g., FasTrak® in the San Francisco Bay Area), and then carry a registered or activated RFID transponder in or on her vehicle. Meanwhile, most toll plazas have RFID reader equipment installed on at least some toll gates. As Alice's vehicle passes through a toll gate on the San Francisco-Oakland Bay Bridge, the onboard FasTrak® transponder communicates to a RFID toll reader a unique radio signature identifying the vehicle. Based on this unique radio signature, the ETC system can then determine the account (i.e., Alice's) from which to deduct the amount of the toll.

Some prepaid toll accounts are set up to be automatically replenished whenever the balance falls below a certain threshold. For example, if Alice subscribes to a FasTrac® credit card account, a replenishment amount equaling her average monthly usage (determined based on the previous 90 days of use) is charged to the credit card linked to the account whenever the account's balance falls below a threshold of $15. Most users, however, wants autonomy over their prepaid toll account balances and would prefer to recharge their prepaid toll account at their own discretion. Control over when and how much to recharge a toll account is especially attractive to users who incur toll charges on an infrequent, intermittent, or irregular basis.

Nevertheless, current technology still imposes drastic limitations on when and where users can recharge prepaid toll accounts. Generally, recharging can only be performed at designated Point of Sale (POS) stations (e.g., convenient store, ATM). As such, users are required to take a number of proactive measures (e.g., check toll account status or balance, find a POS station) well in advance of crossing a toll road since recharging cannot be done instantaneously and on-the-spot. In practice, many users will fail to check their account balance beforehand and won't realize that their account balance is insufficient until they are at or near a toll gate where, absent any POS stations, they must then resort to time consuming manual toll transactions.

One primary reason why current technology falls short is that the conventional toll transponders in use today are single frequency devices. The E-ZPass® transponder, for instance, operate over only a single UHF (i.e., 915 MHz) band. Conventional toll transponders are designed to communicate only with the UHF RFID readers at toll gates. Consequently, only UHF RFID toll readers can gain access to the information stored on conventional toll tags. In contrast, the various embodiments of the systems and methods described herein are directed toward a dual frequency transponder. In various embodiments, Near Field Communication (NFC) technology is integrated with a UHF transponder. The resulting dual frequency transponder, in various embodiments, is capable of communicating with NFC-enabled devices as well as UHF RFID readers. In various embodiments, when implemented as a toll transponder for use in an ETC system, the dual frequency transponder can communicate with both a user's NFC-enabled device (e.g., smartphone) and the typical UHF RFID reader equipment found at toll gates.

Since Nokia introduced the first NFC-enabled phone in 2006, a steady stream of phones with NFC capabilities (e.g., Samsung Nexus™, Motorola Droid) have been marketed and sold. As a result, a growing number of users have a portable NFC reader constantly ready at their disposal. An NFC-enabled smartphone is equipped with an embedded NFC reader module that can communicate with other NFC devices, including but not limited to other NFC-enabled smartphones, NFC POS terminals, and NFC transponders and tags. Unlike other wireless technologies such as Bluetooth®, which generally require manual device discovery and/or pairing, two NFC devices can detect and automatically initiate a connection with one another as soon as they are within range (e.g., 4 cm or less). For example, an unlocked Google Android® smartphone will scan for NFC tags, analyze any discovered NFC tags, categorize data from the NFC tags, and then launch the appropriate application(s) to handle each NFC tag.

Prepaid Account Recharging Solution

FIG. 1A illustrates an embodiment of a System 100 in which an account is managed. According to FIG. 1A, System 100 includes a Transponder 110. In various embodiments, Transponder 110 is a dual frequency transponder that communicates with Device 120 and Reader 130 using different frequency bands. In some embodiments, Transponder 110 is a dual frequency transponder that can operate over both the HF and UHF band. As will be described in more detail below, in some embodiments, Transponder 110 can be embedded, integrated, or otherwise included in a vehicle license plate. However, it is to be understood that multiple other embodiments of Transponder 110 are possible, including but not limited to a sticker (e.g., a self-adhesive decal that can be placed on an automobile window, windshield, or license plate), a clamshell card, and an encapsulated device (e.g., in the housing of a rear-view mirror, headlights or taillights, the vehicle's front or rear bumpers, or in any non-conductive component of the vehicle). In some embodiments, Transponder 110 is an active or semi-active device that relies on a built-in power source (e.g., batteries) to transmit its signals. In other embodiments, Transponder 110 is a passive device that collects energy from interrogating signals from Device 120 and Reader 130.

As shown in FIG. 1A, in various embodiments, Transponder 110 communicates with Device 120. In various embodiments, Device 120 is a NFC-enabled device (e.g., Android® smartphone) and Transponder 110 communicates with Device 120 using the HF band. Meanwhile, in various embodiments, Transponder 110 also communicates with Reader 130. In various embodiments, Reader 130 is a UHF RFID reader device and Transponder 110 communicates with Reader 130 using the UFH band. In particular, in various embodiments, Reader 130 can be a type of RFID reader device that is typically installed at an electronic toll gate. However, as will be described in more detail below, in embodiments where Transponder 110 is integrated, embedded, or otherwise included in a license plate, Reader 130 is preferably placed in the road, underneath passing vehicles as opposed to in an overhead gantry.

In various embodiments, Device 120 communicates with Transponder 110 in order to manage a toll account, and to recharge the toll account instantaneously and on-the-spot. As shown in FIG. 1A, Application 121 is installed on Device 120. In various embodiments, physical interactions between Transponder 110 and Device 120 triggers or activates Application 121. For example, in one embodiment, touching or tapping Transponder 110 and Device 120 together immediately opens Application 121 on Device 120. Alternately, in some embodiments, Application 121 opens immediately when Device 120 is brought within close proximity of Transponder 110. In various embodiments, physical interactions between Transponder 110 and Device 120 further allow Device 120 to scan, read, or otherwise retrieve information stored on Transponder 110. For example, in one embodiment, by touching, tapping, or otherwise positioning Transponder 110 and Device 120 together, Device 120 is able to read the information that is stored on Transponder 110. In various embodiments, Device 120 determines to launch Application 121 automatically based on at least some of the information read from Transponder 110. In some embodiments, instead of gaining access to all of the information stored on Transponder 110 at once, physical interaction between Device 120 and Transponder 110 will initiate an authentication process. In some embodiments, before Device 120 is able to access, for example, prepaid toll account information, a user must provide the proper credentials (e.g., biometrics, username, password).

In various embodiments, at least some of the information stored on Transponder 110 can identify, link, or otherwise provide access to a corresponding prepaid toll account. As will be described in more detail below, in various embodiments, Application 121 is able to use at least some of the information read from Transponder 110 to obtain information associated with the toll account, including but not limited to account status and account balance. As shown in FIG. 1A, Application 121 communicates with ETC Server 170 over Network 140. In various embodiments, Network 140 comprises one or more of a wired network, a wireless network, a local area network, a wide area network, the Internet, or any other appropriate network. In some embodiments, Application 121 uses web or application services provided by ETC Server 170 in order to obtain prepaid toll account information such as account status and balance. Thus, in some embodiments, by activating Application 121 through physical interactions between Transponder 110 and Device 120 (e.g., touch, tap), a user can gain immediate access to latest prepaid toll account information (e.g., status, balance).

In various embodiments, Application 121 additionally provides a user interface for recharging a toll account. For instance, in some embodiments, Application 121 provides one or more GUI components (e.g., text areas or fields, radio buttons, checkboxes, drop-down menu) allowing a user to select or to input, for example, an recharge amount, a payment method (e.g., a credit card selection), and security or authentication credentials for the virtual wallet. In various embodiments, Application 121 is integrated with a virtual wallet (e.g., Google Wallet™) feature on Device 120. As will be described in more detail below, in various embodiments, Application 121 interacts with the virtual wallet (e.g., Google Wallet™) to replenish the user's prepaid toll account.

As shown in FIG. 1A, in various embodiments, in addition to ETC Server 170, Application 121 also communicates with both E-Wallet Server 150 and Payment Processor Server 160 over Network 140. In some embodiments, Application 121 requests payment information (e.g., a credit card number) from E-Wallet Server 150 so that it can then request Payment Processor Server 160 to submit an appropriate recharge amount to ETC Server 170 to replenish the user's prepaid toll account. Advantageously, in various embodiments, the systems and the methods described herein enable prepaid toll accounts to be managed and replenished instantaneously and on-the-spot. For instance, in various embodiments, a user is no longer required to seek out a POS station but can instead recharge his or her prepaid toll account while on the road and from inside the vehicle.

In various embodiments, Transponder 110 also communicates with Reader 130. In various embodiments, Reader 130 comprises a UHF RFID reader that is capable of reading information stored on Transponder 110 using the UHF (865-928 MHz) band. As shown in FIG. 1A, in various embodiments, Reader 130 is a RFID reader installed at a toll gate. Furthermore, as FIG. 1A shows, Reader 130 communicates with ETC Server 170 over Network 140. In some embodiments, information that Reader 130 reads from Transponder 110 is transmitted to ETC Server 170 via Network 140. As will be described in more detail below, in various embodiments, information stored on Transponder 110 can link, correspond, or otherwise provide access to other information, such as information that is stored elsewhere and remotely on a network server. For example, in various embodiments, ETC Server 170 uses the information from Transponder 110 to identify the vehicle and to apply a toll charge to the correct account.

Figure 1B:
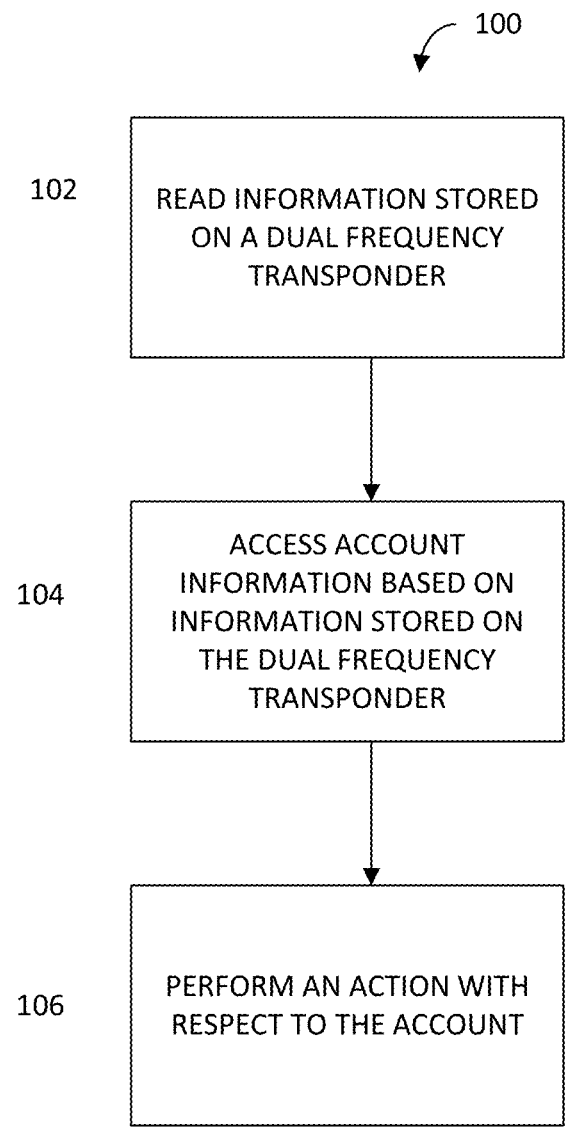
FIG. 1B illustrates an embodiment of a process in which an account is managed.

FIG. 1B illustrates an embodiment of a Process 100 in which an account is managed. In various embodiments, Process 100 is performed as a result of physical interactions between Transponder 110 and Device 120 described with respect to FIG. 1A.

At 102, at least some of the information stored on a dual-frequency transponder is accessed. For example, as described with respect to FIG. 1A, a NFC-enabled device such as Device 120 (e.g., Android® smartphone) is able to read the information stored on Transponder 110. In some embodiments, at last some of the information read from Transponder 110 triggers the launch of Application 121 on Device 120. In addition, a UHF RFID toll reader such as Reader 130 is also able to read the information stored on Transponder 110.

At 104, account information is accessed based on the information stored on the dual-frequency transponder. In various embodiments, at least some of the information stored on Transponder 110 links, corresponds, or otherwise provides access to account information. In various embodiments, the information stored on Transponder 110 links, corresponds, or otherwise provides access to account information that is stored at a remote server. In some embodiments, the information stored at the remote server includes prepaid toll account information including but not limited to account status and balance.

At 106, at least one action is performed with respect to the account. For example, in some embodiments, action includes communicating the account information stored at the remote server (e.g., account status, account balance) to a user of Device 120 via Application 121. As another example a type of action that can be performed with respect to the account, the user of Device 120 can also use Application 121 to recharge the toll account. As will be described in more detail below, the user of Device 120 can replenish the toll account through a virtual wallet that is integrated with Application 121. Finally, in some embodiments, a UHF RFID toll reader is also able to read the information stored on Transponder 110. In various embodiments, the UHF RFID toll reader can be configured to provide some or all of this information to a ETC system. In various embodiments, based on information scanned from the dual-frequency transponder by the UHF RFID toll reader, the ETC system can determine the account from which to deduct a toll charge.

Recharging with a Virtual Wallet

As described earlier with respect to FIG. 1A, various embodiments of the systems and methods described herein simplify and abbreviate the process to recharge a toll account. For instance, in various embodiments, the recharging process can be initiated by simply bringing an NFC-enabled device (e.g., Device 120) within the range of a dual frequency transponder (e.g., Transponder 110). In response, in various embodiments, the NFC-enabled device (e.g., Device 120) immediately launches an application (e.g., Application 121) that is integrated with a virtual wallet (e.g., Google Wallet™). Otherwise stated, in various embodiments, scanning a dual frequency toll transponder with a NFC-enabled device triggers an application that is configured to interact directly with the virtual wallet. In various embodiments, the application provides a user interface for a user to select or input various options (e.g., amount, credit card, credentials) to recharge a toll account. At the same time, in various embodiments, functions and features of the virtual wallet are integrated into the application using one or more appropriate Application Programming Interfaces (APIs). For example, to enable the integration of Google Wallet™ within the application, the Android® Software Development Kit (SDK) offers the following three basic APIs: Google Wallet online commerce API, Google Wallet for digital goods API, and Google Checkout API.

Figure 2:
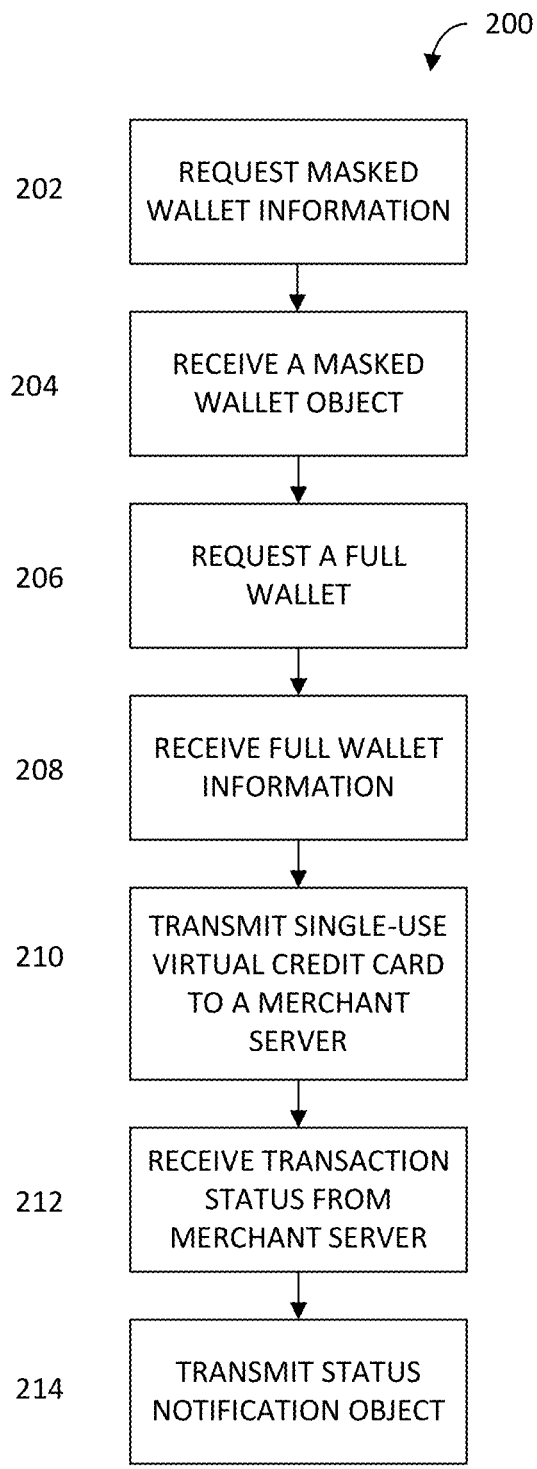
FIG. 2 illustrates an embodiment of a process for replenishing an account using a virtual wallet.

FIG. 2 illustrates an embodiment of a Process 200 for recharging a toll account using a virtual wallet. In various embodiments, Process 200 is performed by an application, such as Application 121 described with respect to FIG. 1A. In some embodiments, Process 200 is performed at 106 of Process 100 described with respect to FIG. 1B. In one exemplary embodiment shown in FIG. 2, Process 200 can be performed by the application to recharge a toll account using payment information obtained directly from Google Wallet™. In various embodiments, the application is configured to exchange payment information with the Google Wallet™ backend server. In various embodiments, the application and the Google Wallet™ backend server exchange payment information using signed JavaScript Object Notation (JSON) data objects called JSON Web Tokens (JWTs).

In some embodiments, the application can offer users the option to recharge their prepaid toll account using Google Wallet™. Advantageously, in some embodiments, using a virtual wallet such as Google Wallet™ further expedites the recharging process since users are able to avoid manually inputting payment information (e.g., credit card number, billing address, etc.). For example, in some embodiments, after a user, Bob, indicates that he would like to recharge his prepaid toll account by adding $10 to the account, he can then select or click on a "Buy with Google" button to complete or finalize the recharging transaction almost instantaneously. In some embodiments, selecting to pay with a virtual wallet such as by clicking on the "Buy with Google" button triggers Process 200.

At 202, masked wallet information is requested. In various embodiments, the application sends to the Google Wallet™ backend server a masked wallet request JWT. In various embodiments, masked wallet information comprises a Java object containing a masked or partially hidden version of Bob's credit card number. In some embodiments, masked wallet information can further include Bob's shipping address. At 204, a masked wallet object is received. In various embodiments, in response to the request from the application, the Google Wallet™ backend server returns to the application a masked wallet response JWT. In various embodiments, the application can display an order review page or screen to Bob based on the masked wallet information. At 206, a full wallet is requested. In various embodiments, after receiving the masked wallet object at 204, the application will then need full wallet information to complete Bob's order. As such, in some embodiments, the application then sends to the Google Wallet™ backend server a full wallet request JWT. At 208, full wallet information is received. In various embodiments, the Google Wallet™ backend server responds to the request by providing a full wallet response JWT to the application. In various embodiments, the full wallet information includes details of a single-use virtual credit card for the transaction. At 210, the single-use virtual credit card is transmitted. In various embodiments, the application passes the single-use virtual credit card provided by Google Wallet™ in the full wallet to a merchant server (e.g., Payment Processor Server 160 described with respect to FIG. 1A). At 212, transaction status is received. In various embodiments, the merchant server processes the payment and notifies the application of the status of the transaction (e.g., success or failure). Finally, at 214, a status notification object is transmitted. In various embodiments, based on the status notification from the merchant server (e.g., success or failure), the application then creates and sends a transaction status JWT to the Google Wallet™ backend server. In addition, in various embodiments, the application displays a confirmation screen informing Bob that $10 has been added to his prepaid toll account.

Dual Frequency Transponder Data Links

PCT Application No. PCT/EP2012/001765, entitled "Method and Apparatus for Providing and Managing Information Linked to RFID Data Storage Media in a Network", filed Apr. 25, 2012, which is incorporated herein by reference, describes the management of data that is linked to or otherwise associated with a RFID storage medium. The various embodiments of the methods and systems described herein are directed toward using a dual frequency transponder to manage and replenish a toll account. In the various embodiments described herein, the dual frequency transponder can communicate with both a NFC-enabled device and a UHF RFID reader. In various embodiments, data stored on the dual frequency transponder links, corresponds, or otherwise provide access to a toll account. Thus, in various embodiments, both NFC-enabled devices (e.g., Android® smartphones) and UHF RFID readers (e.g., common types of toll readers) are able to read or scan information that is stored on the dual frequency transponder and then perform a number of essential functions based on this information.

As described earlier with respect to FIG. 1A, various embodiments of the systems and methods enable an account to be managed and recharged instantly and on-the-spot. In various embodiments, bringing an NFC-enabled device (e.g., Device 120) within the range of a dual frequency transponder (e.g., Transponder 110) automatically triggers the launch of an application on the NFC-enabled device. In various embodiments, the application can provide the latest prepaid toll account information (e.g., status, balance). Furthermore, in various embodiments, the application is integrated with a virtual wallet (e.g., Google Wallet™) thereby enabling a user to recharge the toll account instantly and on-the-spot. In the example described with respect to FIG. 2, Bob uses his Android® smartphone to scan the dual frequency transponder and is subsequently able to add $10 to his prepaid toll account.

In various embodiments, the information stored in the dual frequency transponder links, corresponds, or otherwise provides access to an account. In various embodiments, a NFC-enabled device reads data that is stored on an RFID data storage medium (e.g., a dual frequency transponder) and then uses this data to access additional data that is stored at a remote server. For example, in various embodiments, reading or scanning the information stored in the dual frequency transponder enables the application to access a designated memory area at a remote server (e.g., ETC Server 170). In some embodiments, the application is then able to retrieve, for example, prepaid toll account information from the remote server. Additionally, in various embodiments, the application is also able to update the toll account information stored at the remote server, including but not limited to by submitting a recharge payment that alters the status or balance of the toll account.

Figure 3:
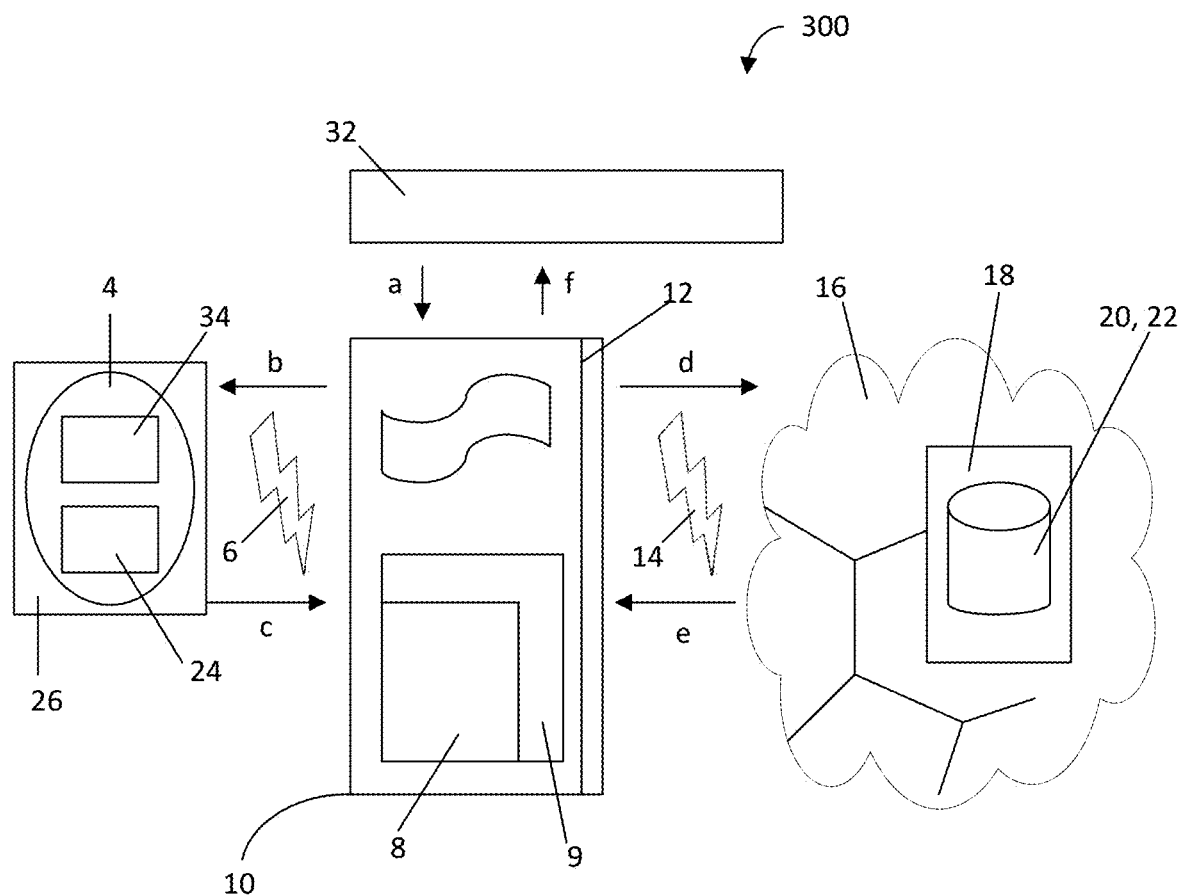
FIG. 3 illustrates an embodiment of a system in which an account is managed.

FIG. 3 illustrates an embodiment of a System 300 in which an account is managed. In various embodiments, User 32 operates Device 10, which is a NFC-enabled device such as an Android® smartphone. In various embodiments, Application 30 is an application that permits User 32 to manage and replenish a toll account, including by providing current account information (e.g., status, balance) and options to replenish the toll account. In various embodiments, Device 10 includes a NFC RFID Reader 8 that is capable of reading data stored in RFID Storage Medium 4. In various embodiments, RFID Storage Medium 4 is a dual frequency transponder such as Transponder 110 described with respect to FIG. 1A or Transponder 400 described with respect to FIG. 4. In some embodiments, Application 30 is installed on Device 10. As such, in some embodiments, when NFC RFID Reader 8 reads or scans data from RFID Storage Medium 4, Device 10 can launch Application 30 automatically based on this data. Otherwise stated, in some embodiments, Application 130 can be launched when User 32 brings Device 10 within sufficient range of RFID Storage Medium 4 for NEC RFID Reader 8 to read or scan data from RFID Storage Medium 4. In other embodiments, Application 130 is not already installed on Device 10. In those embodiments, data read or scanned from RFID Storage Medium 4 directs Device 10 to a link to download and install Application 130.

As shown in FIG. 3, in various embodiments, RFID Storage Medium 4 includes a RFID Data Record 24 and an additional Memory 34. In various embodiments, NFC RFID Reader 8 is configured to read or scan the data stored on RFID Data Record 24. For example, in some embodiments, NFC RFID Reader 8 directs a request to RFID Storage Medium 4. In response, in some embodiments, RFID Storage Medium 4 releases the data stored on RFID Data Record 24 to NFC RFID Reader 8. In some embodiments, User 32 must be authenticated (e.g., biometrics, username, password) before RFID Storage Medium 4 releases its data to NFC RFID Reader 8. In various embodiments, Application 30 generates uses the data released from RFID Data Record 24 to generate access rights for Additional Data 22 that stored in Data Memory Area 20 of a Remote Server 18. In some embodiments, in order to generate access rights to Additional Data 22, User 32 also must provide one or more forms of security or authentication credentials (e.g., biometrics, username, password). In various embodiments, Additional Data 22 can include account information (e.g., status, balance) with respect to the toll account. In some embodiments, Remote Server 18 can be a server associated with an ETC system, such as ETC Server 170 described with respect to FIG. 1A. In various embodiments, Application 30 requests for Additional Data 22 from Remote Server 18 by sending, for example, access rights to Remote Server 18 over Network 16. In various embodiments, in response to the request from Application 30, Remote Server 18 transmits Additional Data 22 to Device 10 via Network 16. In various embodiments, Application 30 can then provide, with or without further processing or analysis, Additional Data 22 to User 32.

Dual Frequency Transponder

Figure 4:
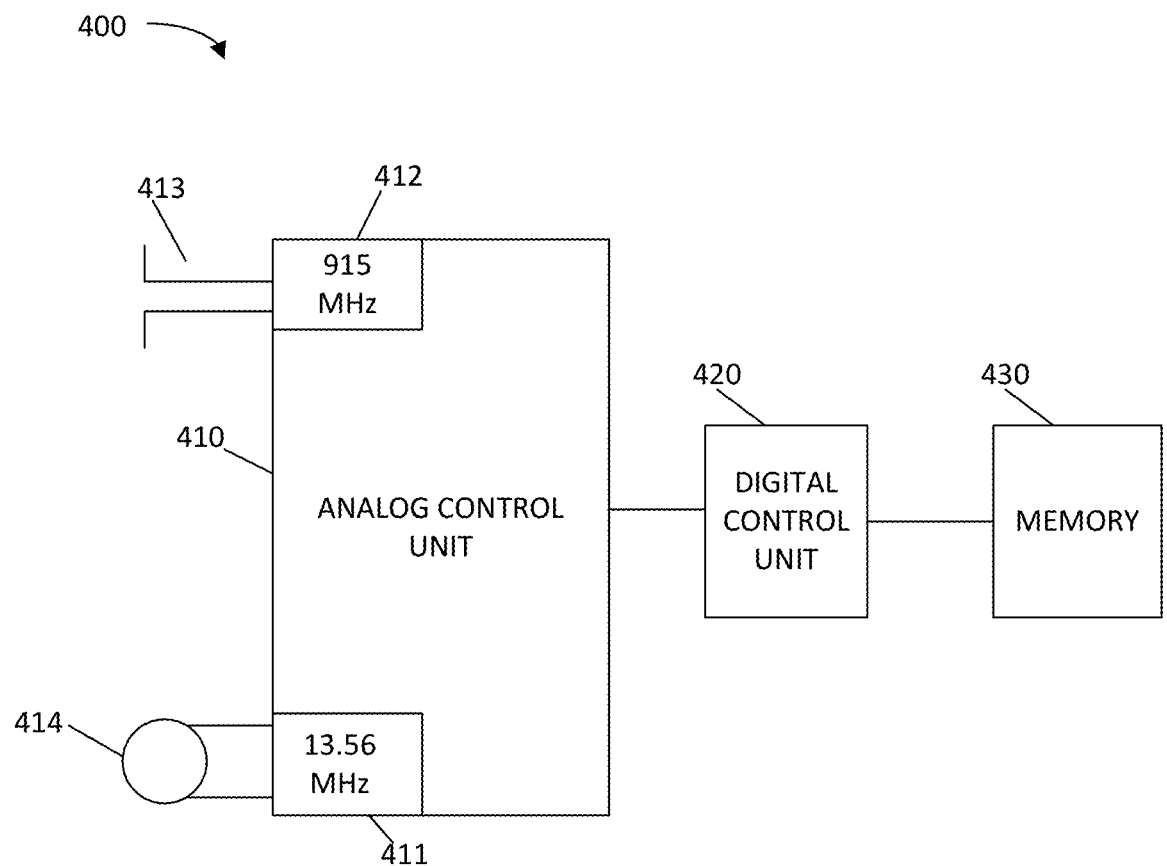
FIG. 4 illustrates an embodiment of a transponder used to manage an account.

FIG. 4 illustrates an embodiment of a Transponder 400 used to manage an account. In various embodiments, Transponder 400 is a multi-frequency or frequency-independent transponder. In various embodiments, Transponder 400 is a dual frequency transponder that operates over both the HF (e.g., 13.56 MHz) and UHF (e.g., 865-928 MHz) band. In various embodiments, Transponder 400 shown in FIG. 4 can be used to implement Transponder 110 described with respect to FIG. 1A. Advantageously, in various embodiments, Transponder 400 is capable of communicating with both a NFC-enabled device and a UHF RFID reader. For instance, in some embodiments, when a NFC-enabled device such as an Android® smartphone is brought within the range of Transponder 400, the NFC-enabled device can respond by automatically launching an application (e.g., Application 121 described with respect to FIG. 1A) that enables a quick and on-the-spot recharge of a toll account. In addition, in some embodiments, a UHF RFID reader installed at a toll gate can use information scanned from Transponder 400 to determine the correct prepaid toll account from which to deduct a toll charge.

As FIG. 4 shows, Transponder 400 includes a base layer and at least one radio frequency device disposed upon the base layer. In various embodiments, the radio frequency device comprises at least one chip and at least one antenna that are in electrically coupled with the chip. In some embodiments, Transponder 400 can include a frequency-independent chip. In those embodiments, Transponder 400 can include a single manufactured silicon chip that is configured, through proper connections and match to an appropriate antenna, to operate using any of the relevant frequencies (e.g., 13.56 MHz and 915 MHz) assigned to Transponder 400. Alternately, in some embodiments, Transponder 400 can include a multi-frequency (e.g., dual frequency) chip. In those embodiments, Transponder 400 includes a chip that is designed and characterized to operate with a specific antenna at several (e.g., two) different frequencies.

As FIG. 4 shows, in some embodiments, Transponder 400 further includes an Analog Control Unit 410, which is a dual interface with a combination of two frequencies. For example, in some embodiment, Analog Control Unit 410 includes a HF System 411 and a UHF System 412, both described in more detail below. In various embodiments, UHF System 412 operates over the 915 MHz band and is used for communicating with UHF RFID readers, including but not limited to conventional UHF RFID toll readers. As FIG. 4 further shows, in some embodiment, UHF System 412 includes Antenna 413, which can be a dipole antenna. Meanwhile, in various embodiments, HF System 411 is used for communicating with NFC-enabled devices, such as Android® smartphones. In some embodiments, the HF System 411 includes Antenna 414, which can be a coil antenna constructed from a helix of insulated wire.

In various embodiments, Transponder 400 can further include Digital Control Unit 420 and Memory 430. In various embodiments, Analog Control Unit 401 comprises a continuous-time system. That is, in various embodiments, Analog Control Unit 401 comprises a system that is continuous in both time and magnitude. Furthermore, in various embodiments, Analog Control Unit 401 inputs and outputs analog signals. A signal is considered analog if it is defined for every point in time (i.e., continuous-time) and is able to take any real magnitude value within its range. In contrast, in various embodiments, Digital Control Unit 420 comprises a discrete-time and quantized system. In various embodiments, Digital Control Unit 420 takes in digital input signals and produces digital output signals. A digital signal is only defined for particular points in time (i.e., discrete-time) and can only take on certain quantized values (e.g., 0s and 1s in a binary system). In some embodiments, Analog Control Unit 410, Digital Control Unit 420, and Memory 430 are all components on a single integrated RFID circuit chip.

Figure 5:
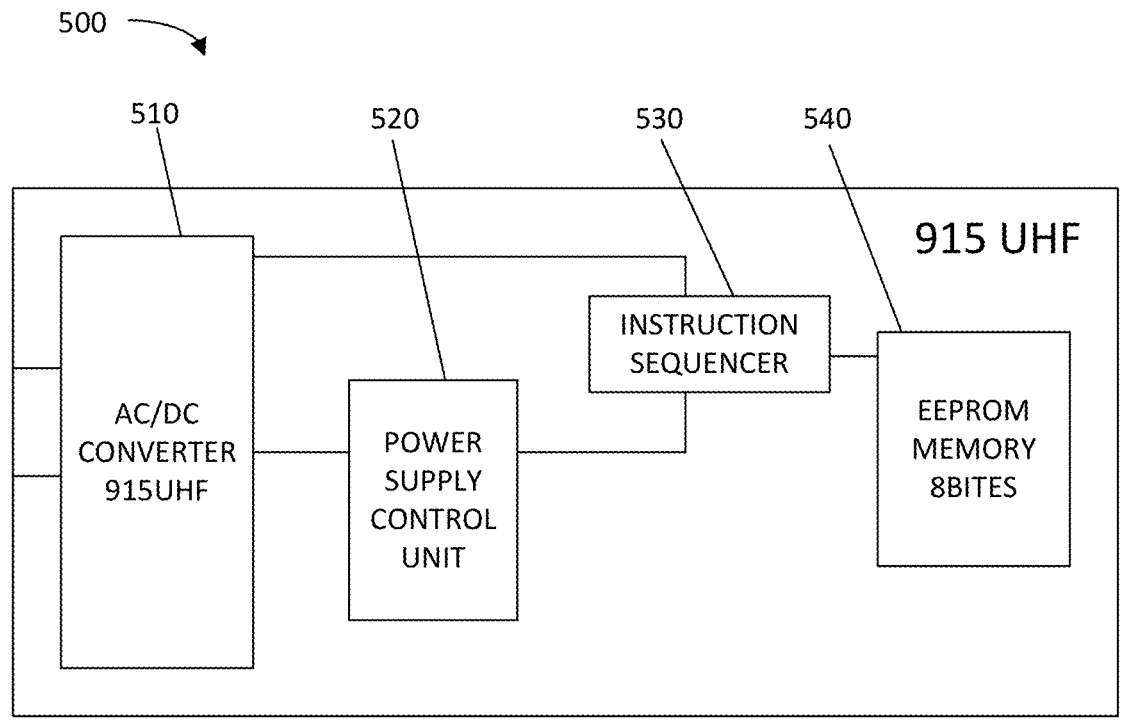
FIG. 5 illustrates an embodiment of a UHF system.

FIG. 5 illustrates an embodiment of an UHF System 500. In various embodiments, UHF System 500 can be used to implement UHF System 412 described with respect to FIG. 4. Furthermore, in various embodiments, UHF System 500 can be used to implement the UHF component of a dual frequency transponder, such as Transponder 110 described with respect to FIG. 1A. In various embodiments, UHF System 500 operates over a UHF (865-928 MHz) band. As shown in FIG. 5, UHF System 500 uses the 915 MHz or 2.45 GHz band. In various embodiments, a dual frequency transponder that incorporates UHF System 500 is capable is interacting with a UHF RFID reader. Many ETC systems have UHF RFID readers installed at toll gates. For instance, readers in the E-ZPass® system broadcast a 915 MHz signal while E-ZPass® transponders are configured to listen for and respond to the 915 MHz signal. In some cases, particularly where a transponder is configured to operate passively, the transponder can respond to the 915 MHz signal broadcast by a reader with a backscatter signal to the reader that conveys the data stored in the transponder. In various embodiments, data transmitted to the UHF RFID reader includes data (e.g., a unique radio signature) that links, corresponds, or otherwise provides access to the toll account associated with each passing vehicle. As such, in various embodiments, this data enables the ETC system to identify or determine the toll account to which to apply the toll charge.

As shown in FIG. 5, UHF System 500 includes AC/DC Converter 510, Power Supply Control Unit 520, Instruction Sequencer 530, and Memory 540. In various embodiments, AC/DC Converter 510 receives an alternating current (AC) and converts it to a direct current (DC). Meanwhile, in various embodiments, Power Supply Control Unit 520 is configured to regulate voltage and current to protect UHF System 500 fluctuations in power (e.g., power surge). In various embodiments, Instruction Sequencer 530 queues instructions that are directed to Memory 540. Finally, in various embodiments, Memory 540 comprises an EEPROM (Electrically Erasable Programmable Read-Only Memory) that stores data, such as instructions from Instruction Sequencer 530.

Figure 6:
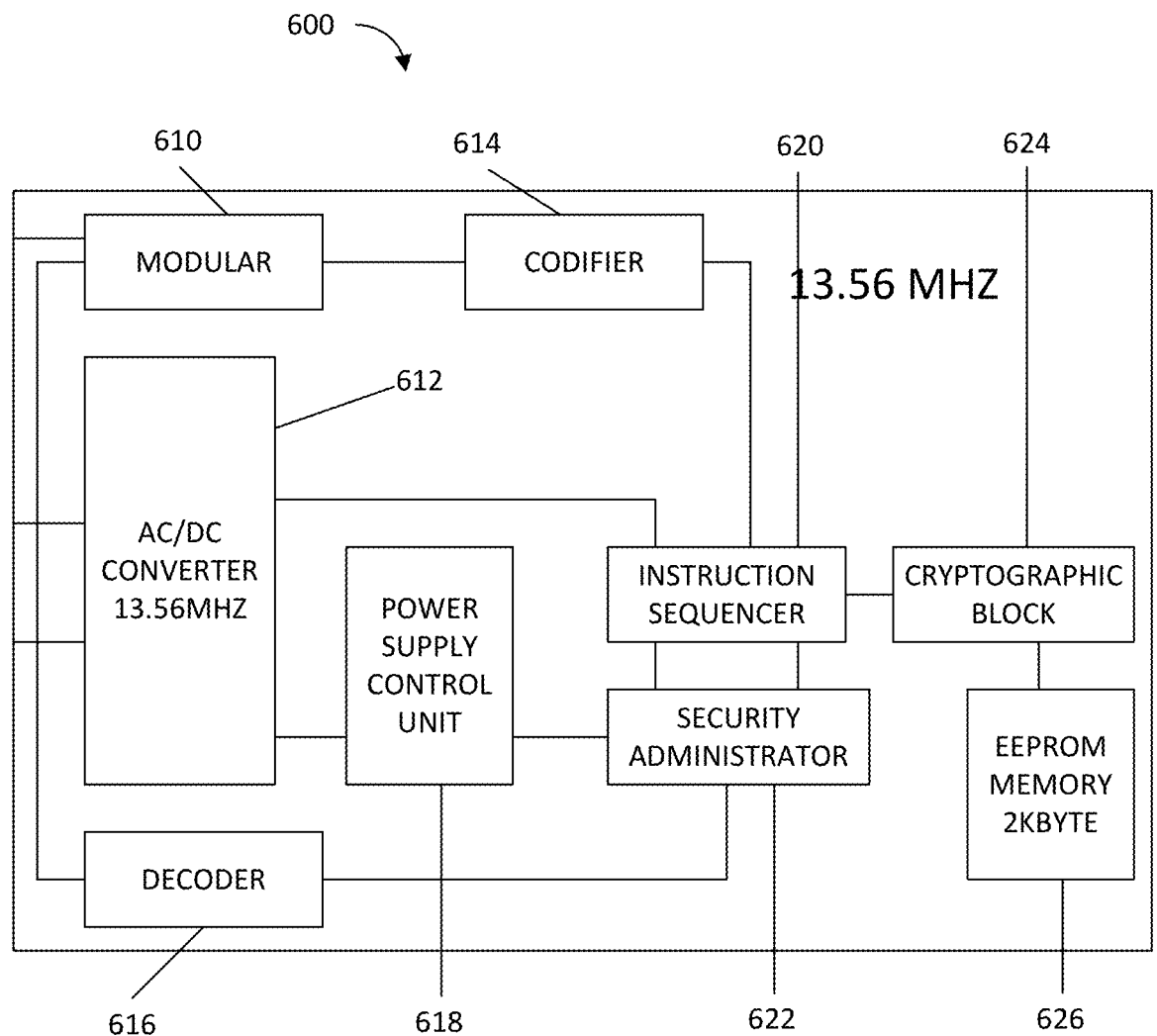
FIG. 6 illustrates an embodiment of a HF system.

FIG. 6 illustrates an embodiment of a HF System 600. In various embodiments, HF System 600 can be used to implement HF System 411 described with respect to FIG. 4. Furthermore, in various embodiments, HF System 600 can be used to implement the HF component of a dual frequency transponder, such as Transponder 110 described with respect to FIG. 1A. As shown in FIG. 6, HF System 600 uses the 13.56 MHz band. In various embodiments, a dual frequency transponder that incorporates HF System 600 is capable of interacting with a NFC-enabled device (e.g., Android® smartphone) when the dual frequency transponder touches, taps, or is otherwise brought within the range of the NFC-enabled device. For example, bringing an Android® smartphone within the range of the dual frequency transponder activates an Android Beam™ feature on the smartphone.

The Android Beam™ feature allows data to be transferred one NFC-enabled device to another NFC-enabled device via NFC. For example, in some embodiments, Android Beam™ allows data to be transferred from the dual frequency transponder to an Android® smartphone via NFC. In various embodiments, data from the dual frequency transponder triggers the launch of an appropriate application on the Android® smartphone to handle the data. In various embodiments of the systems and methods described herein, when a NFC-enabled device (e.g., Android® smartphone) reads data from a dual frequency transponder with an integrated HF component (e.g., HF System 600), an application to recharge a toll account launches automatically. For example, in some embodiments, data read from the dual frequency transponder links, corresponds, or otherwise provide access to a toll account. In one common scenario, the toll account has a deficient balance and needs to be recharged before a corresponding vehicle can pass through an ETC toll gate. In various embodiments, the application, through integration with a virtual wallet (e.g., Google Wallet™), enables the toll account to be recharged instantly and on-the-spot.

As shown in FIG. 6, HF System 600 includes Modulator 610, AC/DC Converter 612, Codifier 614, Decoder 616, Power Supply Control Unit 618, Instruction Sequencer 620, Security Administrator 622, Cryptographic Block 624, and Memory 626. In various embodiments, Modulator 610 is configured to receive baseband signals from an antenna, such as coil Antenna 414 described with respect to FIG. 4. In various embodiments, AC/DC converter 612 is configured to receive and convert an alternating current (AC) to a direct current (DC). Meanwhile, in various embodiments, Codifier 614 is configured to encode the baseband signals received by Modulator 610 so that the signals can be utilized by another device or protocol, including Instruction Sequencer 620. In various embodiments, Decoder 616 is configured to decode information from Codifier 614 so that it may be used by another device or display. In various embodiments, Instruction Sequencer 620 is configured to queue instructions destined for Memory 626. In various embodiments, Security Administrator 622 is configured to validate the cryptographic keys sent to Cryptographic Block 624. In various embodiments, Cryptographic Block 624 or Memory 626 can be configured store the security keys that, for example, have been validated by Security Administrator 622 and that can be used to control (e.g., grant, deny) access to the dual frequency transponder's memory or certain content therein. Finally, in various embodiments, Power Supply Control Unit 618 is configured to regulate voltage and current in order to protect HF System 600 from power fluctuations (e.g., power surges).

RFID-Enabled License Plate

The various embodiments of the systems and methods described herein are directed toward the use of a dual frequency transponder (e.g., Transponder 110 described with respect to FIG. 1A and Transponder 400 described with respect to FIG. 4) to manage and recharge an account. In particular, in various embodiments, the dual frequency transponder provides information that enables the application of both toll charges and reload payments to the appropriate prepaid toll account. Since in various embodiments, the dual frequency transponder is configured to interact both with the UHF RFID toll readers and with a user's NFC-enabled device, the dual frequency transponder should preferably be set in a location that is convenient and accessible for scanning by both the UHF RFID toll readers and the user's NFC-enabled device. Thus, in some embodiments, it is desirable to attach the dual frequency transponder to the vehicle associated with the toll account. As such, in some embodiments, the dual frequency transponder can be a sticker (e.g., a self-adhesive decal that can be placed on an automobile window, windshield, or license plate), a clamshell card, or an encapsulated device (e.g., in the housing of a rear-view mirror, headlights or taillights, the vehicle's front or rear bumpers, or in any non-conductive component of the vehicle).

In some embodiments, the dual frequency transponder can also be embedded in the vehicle's license plate. However, vehicle license plates are most commonly made from metal (e.g., aluminum). Direct and uninsulated contact between a transponder (single or multi-frequency) and a metal license plate (e.g., applying the transponder directly onto the metal license plate) can short or severely detune the transponder's antenna(s) (e.g., Antenna 413 and Antenna 414 described with respect to FIG. 4), rendering the transponder virtually unreadable. Thus, in the exemplary embodiments described in more detail below, a transponder is embedded in a metal license plate in ways that neither compromise the performance of the transponder's antenna(s) nor add undesirable bulk to the license plate's usual dimensions. In the various exemplary embodiments described in more detail below, a RFID-enabled license plate is configured to resonate at multiple frequencies (e.g., HF and UHF bands). In some embodiments, a resonator for the transponder is formed from the license plate itself if the license plate is metal. In other embodiments, whether the plate is metal or non-metal, the resonator can also be formed from a metalized layer (e.g., retro-reflective material, holographic foil, or any other appropriate metallic substrate) covering the license plate.

Figure 7A:
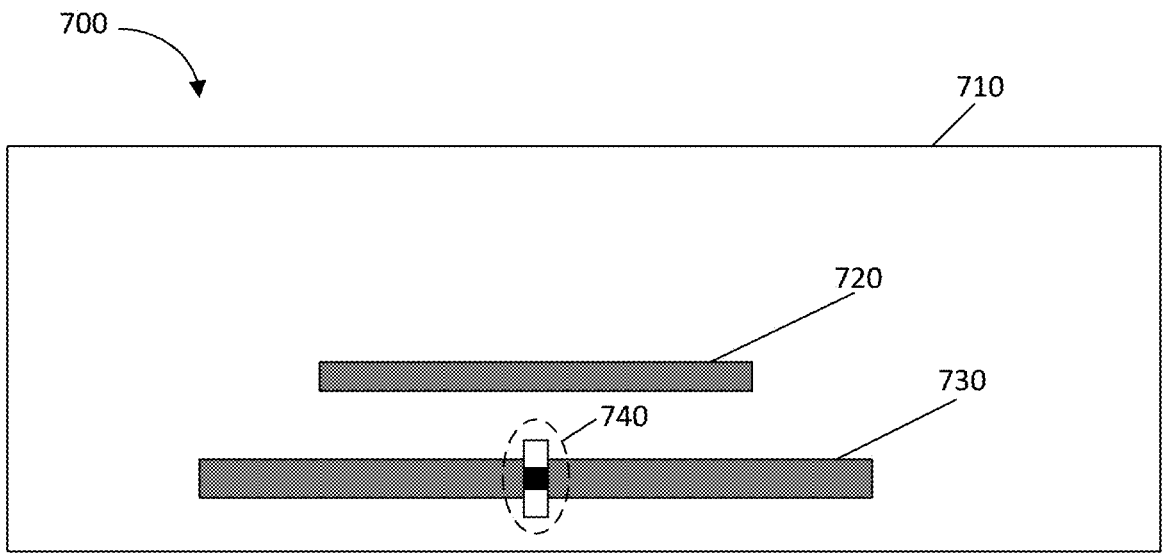
FIG. 7A illustrates the top view of an embodiment of a RFID-enabled license plate.

FIG. 7A illustrates the top view of an embodiment of a RFID-Enabled License Plate 700. In various embodiments, RFID-Enabled License Plate 700 includes a metal Plate 710. In various embodiments, RFID-Enabled License Plate 700 can be configured to include one or more slots, which are open areas that are cut or punched out of Plate 710. In some embodiments, RFID-Enabled License Plate 700 can be configured to include multiple slots. As shown in FIG. 7A, in some embodiments, RFID-Enabled License Plate 700 includes Slot 720 and Slot 730. In various embodiments, both Slot 720 and Slot 730 can be filled with a non-metal material. In various embodiments, the non-metal material can be stuffed, extruded, or otherwise deposited into Slot 720 and Slot 730. In various embodiments, the non-metal material remains flush with respect to both the front and rear surfaces of Plate 710. Furthermore, as shown in FIG. 7A, a RFID Strap 740 can be positioned across Slot 730 as illustrated. In some embodiments, RFID Strap 740 includes a RFID chip as well as contacts that are connected to or capacitively coupled with Plate 710. In other embodiments, RFID Strap 740 can include a RFID chip and an antenna, wherein the antenna is inductively coupled with Plate 710. In various embodiments, the respective and relative dimensions, spacing, and location of Slots 720 and 730 are configured such that the slot antenna formed from Plate 710, Slots 720 and 730, and Strap 740 will resonate at multiple desired frequencies. In various embodiments, the slot antenna configured according to FIG. 7A is able to resonate at both a HF (e.g., 13.56 MHz) and a UHF (e.g., 915 MHz) band. As described in more detail below, in other embodiments, instead of multiple slots (e.g., Slot 720 and Slot 730 in Plate 710) configured to resonate at several different frequencies, a RFID-enabled license plate can also include just a single slot configured to resonate at a single frequency.

Figure 7B:
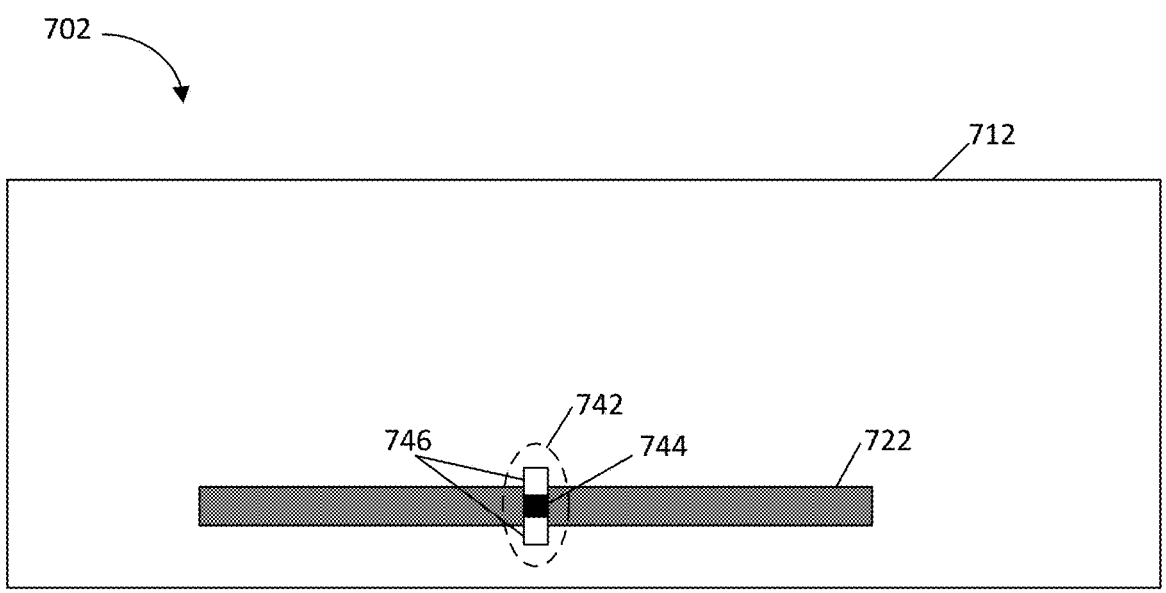
FIG. 7B illustrates the top view of an embodiment of a RFID-enabled license plate.

FIG. 7B illustrates the top view of another embodiment of an RFID-Enabled License Plate 700. In various embodiments, RFID-Enabled License Plate 700 includes a Plate 710 that is constructed out of metal. As shown in FIG. 7B, in various embodiments, RFID-Enabled License Plate 700 can be configured to include a single Slot 720, which is cut or punched out of Plate 710. In various embodiments, Slot 720 can be stuffed, extruded, or otherwise deposited with a non-metal material that remains flush with respect to both the front and rear surfaces of Plate 710. In the embodiment shown in FIG. 7B, an RFID Strap 730 is positioned over Slot 720. In various embodiments, RFID Strap 730 includes a RFID Chip 740 and Contacts 750. In various embodiments, Contacts 750 can be connected to Plate 710 through solder, adhesive paste, or both. In some embodiments, Contacts 750 are capacitively coupled with Plate 710. Depending on the embodiment, RFID Strap 730 can be placed on either the front surface or the rear surface of Plate 710. Configured according to FIG. 7B, the entire Plate 710 becomes a slot antenna coupled with the RFID Chip 740, which is less sensitive to the detuning effects of a metal car frame.

Figure 7C:
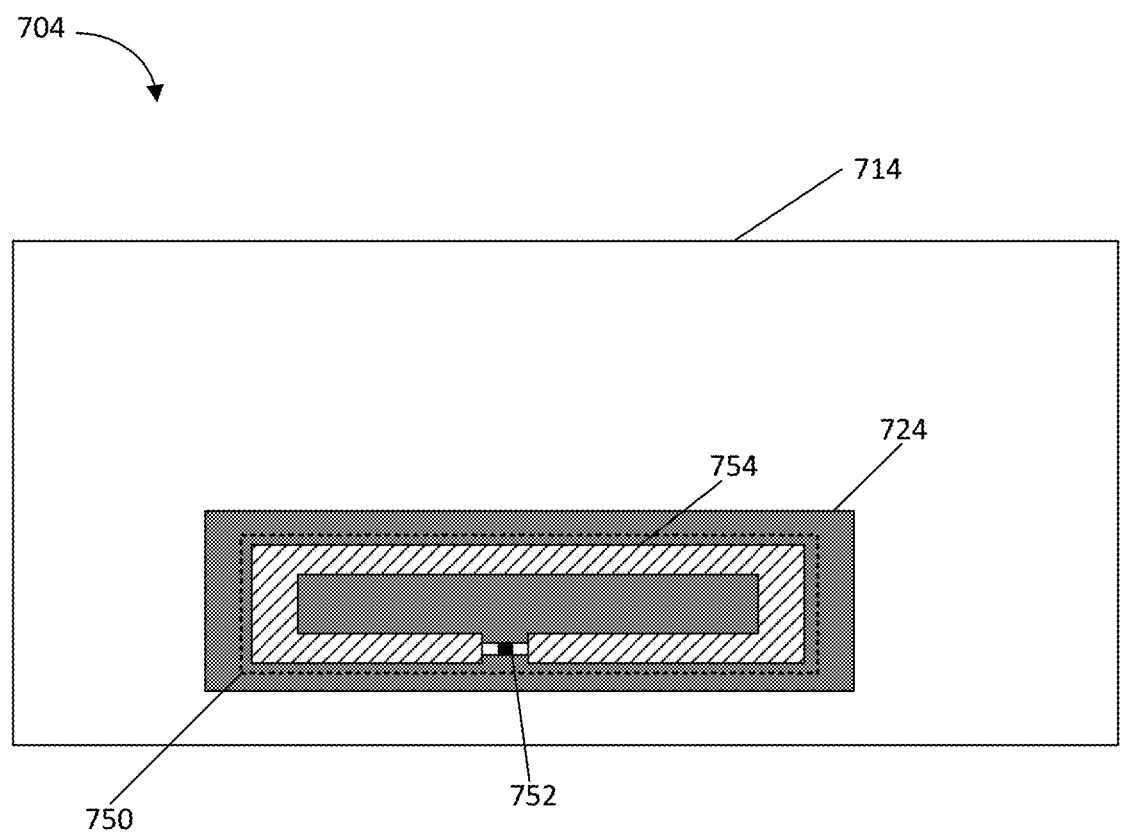
FIG. 7C illustrates the top view of an embodiment of a RFID-enabled license plate.

FIG. 7C illustrates the top view of another embodiment of RFID-Enabled License Plate 700. In various embodiments, RFID-Enabled License Plate 700 comprises a metal Plate 710 that includes a Slot 720, which is an open area that has been cut or punched out of Plate 710. In some embodiments, instead of an RFID strap (e.g., RFID Strap 740 described with respect to FIGS. 7A and 7B) positioned over Slot 720, an RFID Transponder Module 730 is placed directly inside of Slot 720 as shown in FIG. 7C. In various embodiments, RFID Transponder Module 730 includes an RFID Chip 740 that is coupled with a Feeding Loop 750. Furthermore, as shown in FIG. 7C, in some embodiments, Slot 720 is positioned such that Feeding Loop 750 is either capacitively coupled with Plate 710. Although not shown, in other embodiments, Feeding Loop 750 can be inductively coupled with Plate 710. Advantageously, RFID Transponder Module 730 can be made sufficiently thin such that even when RFID Transponder 730 is installed within Slot 720, it creates a substantially planar surface with respect to Plate 710.

In some embodiments, a RFID-enabled license plate can include a transponder that will not function absent a valid and properly positioned vehicle registration sticker. For example, in some embodiments, the transponder can be intentionally tuned to a lower frequency (e.g., less than 915 MHz) and therefore cannot be properly read by a UHF RFID reader. Meanwhile, in some embodiments, applying a valid vehicle registration sticker in the correct position on the RFID-enabled license plate tunes the transponder to the correct and operational frequency (e.g., 915 MHz) so that the transponder can be read by a UHF RFID reader. In various embodiments, the vehicle registration sticker is fabricated from or otherwise includes one or more metallic or other conductive materials.

Figure 8:
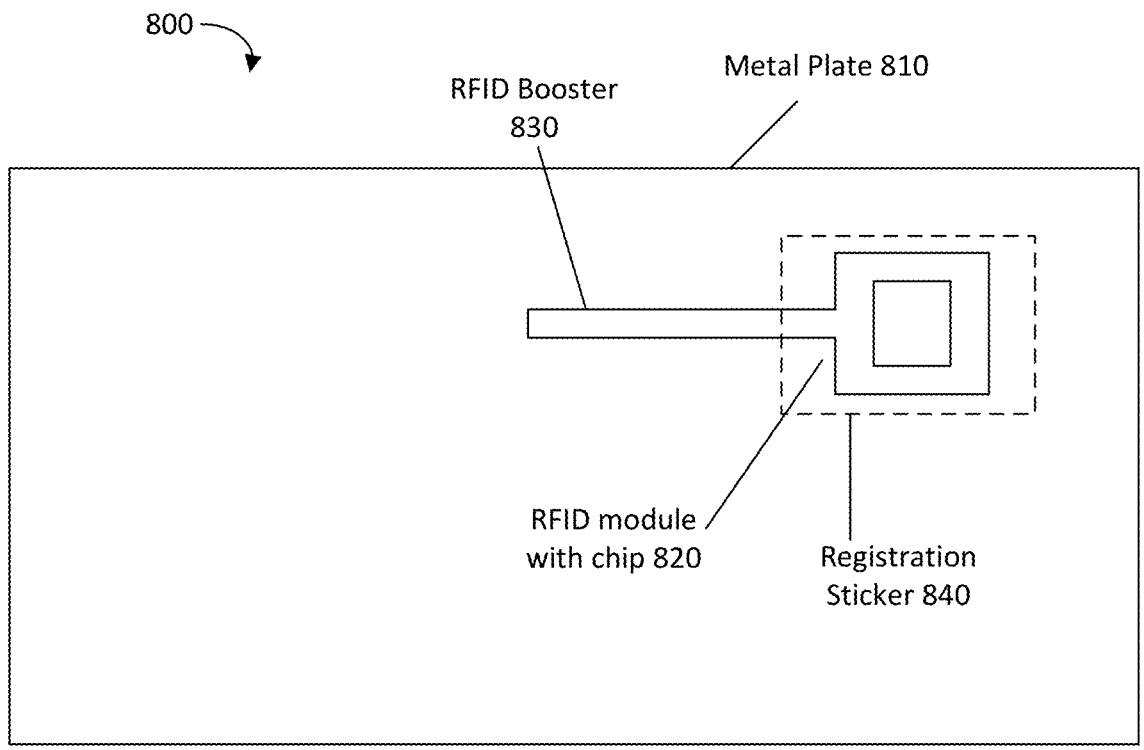
FIG. 8 illustrates the top view of an embodiment of a RFID-enabled license plate.

FIG. 8 illustrates an embodiment of a RFID-Enabled License Plate 800. In various embodiments, RFID-Enabled License Plate 800 includes a metal Plate 810 and a RFID Module 820. As shown in FIG. 8, RFID-Enabled License Plate 800 comprises an RFID Booster 830. In some embodiments, RFID Booster 830 can be a slot antenna formed from Plate 810, RFID Module 820, and one or more properly sized and positioned slots in Plate 810. In various embodiments, RFID Module 820 is intentionally tuned to a lower, inoperable frequency. In various embodiments, a valid Vehicle Registration Sticker 840 must be applied in a proper location on Plate 810 in order for RFID Module 820 to function properly (e.g., to be scanned or read by a UHF RFID toll reader). As will be described in more detail below, applying Vehicle Registration Sticker 840 in the correct location on RFID-Enabled License Plate 800 tunes RFID Module 820 to the proper frequency band.

Figure 9:
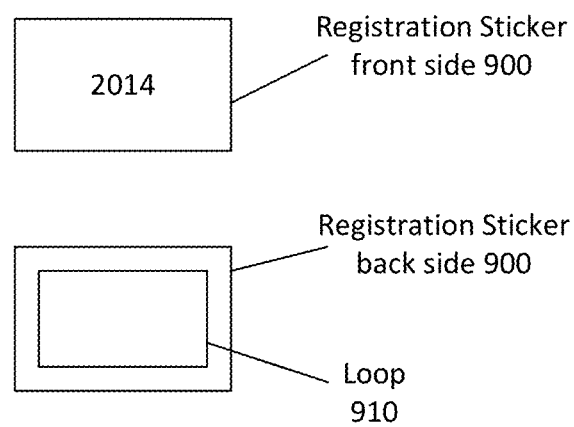
FIG. 9 illustrates an embodiment of a vehicle registration sticker that is used in conjunction with a RFID-enabled license plate.

FIG. 9 illustrates an embodiment of Vehicle Registration Sticker 900 which is used in conjunction with RFID-Enabled License Plate 800 as described in FIG. 8. In various embodiments, Vehicle Registration Sticker 900 can be used to implement Vehicle Registration Sticker 840 described with respect to FIG. 8. As shown in FIG. 9, the back of Vehicle Registration Sticker 900 includes a Loop 910. In various embodiments, when Vehicle Registration Sticker 900 is affixed to a RFID-enabled license plate (e.g., RFID-Enabled License Plate 800) in a proper location, Loop 910 couples to a RFID transponder and tunes the RFID transponder to the proper frequency band for operation. In other embodiments, Vehicle Registration Sticker 900 can comprise RFID Module 820 (i.e., a chip and an antenna). In those embodiments, placement of the Vehicle Registration Sticker on RFID-Enabled License Plate 800 couples Vehicle Registration Sticker 900 with RFID Booster 830. For example, in some embodiments, Vehicle Registration Sticker 900 can include a single frequency (e.g., HF or NFC) transponder. Although FIG. 8 shows that Vehicle Registration Sticker 900 is placed directly over RFID Module 820, in embodiments where Vehicle Registration Sticker 900 is composed of or otherwise includes conductive material, RFID Module 820 do not have to be directly underneath Vehicle Registration Sticker 900.

Typically, in the United States, motorists are required to renew their vehicle registration on an annual basis. For example, California license plates have a month and a year sticker. A properly registered vehicle in California will have been issued a sticker that shows the current year. Although the registration status of a vehicle can be verified visually, in many instances, it would be preferable to verify vehicle registration status through electronic and automated means. Thus, in various embodiments, a vehicle registration sticker that is used in conjunction with a RFID-enabled license plate can further include or be constructed out of a material that gradually degrades as the vehicle's registration approaches expiration. In this manner, an up-to-date vehicle registration sticker is able to tune a RFID transponder in the RFID-enabled license plate to the proper frequency while an expired vehicle registration sticker cannot. Consequently, a vehicle cannot successfully pass through a checkpoint unless the vehicle is also properly registered and is displaying a current vehicle registration sticker.

Vehicle registration stickers are very often made out of a metallic material (e.g., retro-reflective foil). Therefore, in some embodiments, the vehicle registration sticker can be made out of a retro-reflective material that degrades over time. In another embodiment, the loop on the back of the vehicle registration sticker can be made out of a material that degrades over time. Finally, in some embodiments, the adhesive used to bond the vehicle registration sticker to a RFID-enabled license plate can degrade over time.

Figure 10:
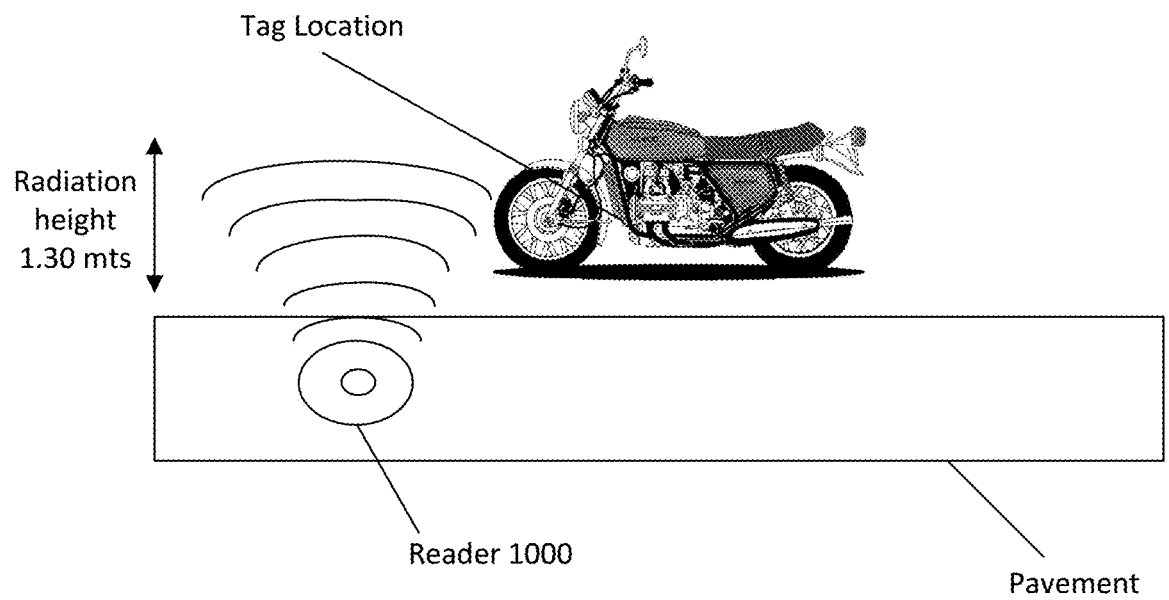
FIG. 10 illustrates an embodiment of the placement of a reader with respect to a RFID-enabled license plate.
Figure 10:
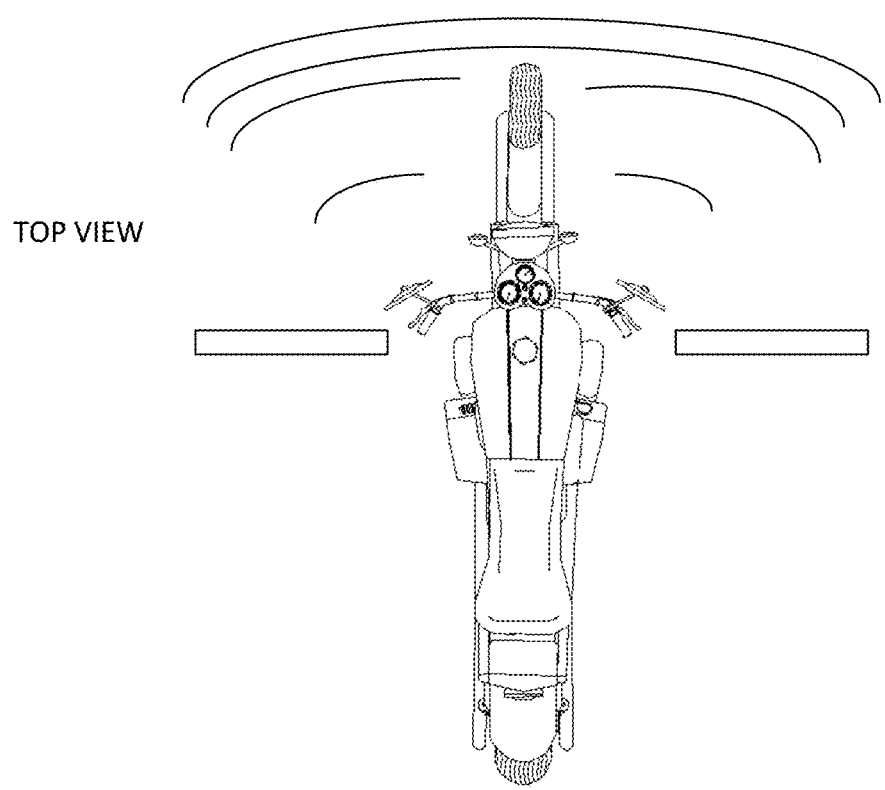

In various embodiments where a RFID-enabled license plate (e.g., RFID-Enabled License Plate 700 and 800) comprises a dual frequency transponder (e.g., Transponder 110, Transponder 400), the RFID-Enabled license plate is able to communicate with a NFC-enabled device and with a UHF RFID reader device. In particular, in various embodiments, the RFID-enabled license plate is designed to be read as a vehicle passes through a toll gate. In various embodiments where the dual frequency transponder is embedded, integrated, or otherwise included in the vehicle's license plate, it would be preferable to install or place the toll readers in the road, rather than in overhead gantries as in conventional ETC systems. FIG. 10 illustrates an embodiment of the placement of a Reader 1000 with respect to a RFID-enabled license plate. Advantageously, placing toll readers according to FIG. 10 can actually greatly reduce the cost of infrastructure associated with ETC since it eliminates the need to build and install gantries above the road. In various embodiments, the maximum height from which a transponder can be read is approximately 3.5 feet above the surface of the pavement. Meanwhile, in various embodiments, Reader 1000 is embedded at least 4 inches below the surface of the pavement. Suppose for common applications such as electronic toll collection, the transponder in a RFID-enabled license plate needs to include a 192-bit Tag Identification (TID) memory. As such, in various embodiments, the maximum speed at which Reader 1000 can successfully read a dual frequency transponder with a 192-bit TID memory that is embedded in a license plate attached to a passing vehicle is 140 kilometers or 87 miles per hour.

Figure 11:
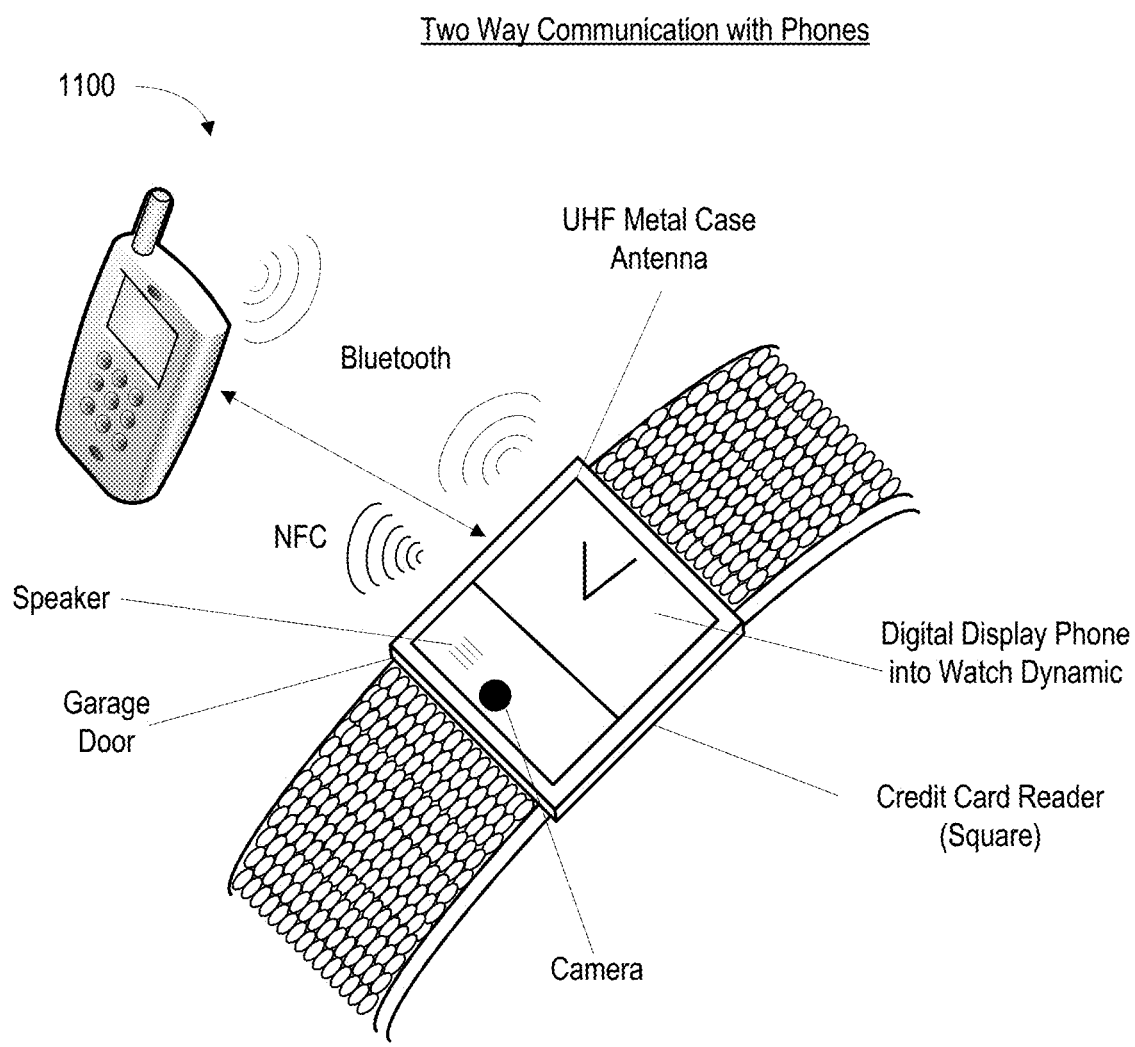
FIG. 11 illustrates an embodiment of a universal transponder.

FIG. 11 illustrates an embodiment of a universal transponder 1100. Referring to FIG. 11, in various embodiments, the universal transponder 1100 can provide multiple functionalities including, for example, but not limited to, short range connectivity (e.g., NFC, Bluetooth®) with another device (e.g., smartphone), camera, credit card reader (e.g., Square®), audio speaker, and remote control (e.g., garage door opener). In various embodiments, the universal transponder 1100 can have a metal casing that can act as an antenna (e.g., in the UHF band). According to one exemplary embodiment, the universal transponder is able to interface with both NFC/HF and UHF systems, and can be used to manage an account.

What is claimed:

1. A system comprising:
   a wearable mobile device comprising a metal casing and a radio frequency identification (RFID) tag having a transponder, the transponder comprising a plurality of antennas, wherein the metal casing comprises a body casing and wherein the body casing is at least one of the plurality of antennas, the transponder configured to:
      communicate via the plurality of antennas and corresponding plurality of frequencies, and
      store information related to an account of a user of the wearable mobile device,
   wherein the RFID tag is configured to:
      communicate at least a first portion of the information related to the account and stored on the RFID tag to a first device using a first RFID reader included the first device operating at a first frequency of the plurality of frequencies, and
      communicate at least a second portion of the information related to the account and stored on the RFID tag to a second device using a second RFID reader included the second device operating at a second frequency of the plurality of frequencies,
   wherein the first device is configured to launch an application in response to receiving the at least the first portion of the information read from the RFID tag, the application comprising a plurality of instructions stored on a memory of the first device, the plurality of instructions causing a processor of the first device to access the account based on the first portion of the information related to the account and update an account balance of the account through interactions with a virtual wallet, and
   wherein the second device is configured to apply a charge to the account based, in part, on the at least a second portion of the information related to the account.

2. The system of claim 1, wherein the first device is a mobile device configured to:
   read, using the first RFID reader, the first portion of the information related to the user stored on the RFID tag, and
   perform one or more actions based, in part, on the first portion of the information read from the RFID tag.

3. The system of claim 2, wherein the first device is further configured to:
   update the account information by updating an account status comprised in the account information based on one or more instructions received from a user via the first device.

4. The system of claim 1, wherein, based in part on communicating at least one of the first portion or second portion of the information related to the account, prompt a user to provide one or more forms of authentication credentials.

5. The system of claim 4, wherein the wearable mobile device is configured to:
   prompt a user to provide one or more forms of authentication credentials, and
   communicate the rest of the information stored on the RFID tag based on successfully authenticating the provided one or more forms of authentication credentials.

6. The system of claim 4, wherein the first device is configured to:
prompt a user to provide one or more forms of authentication credentials, and
access the rest of the information stored on the RFID tag based on successfully authenticating the provided one or more forms of authentication credentials.

7. The system of claim 1, wherein the second device is configured perform an action related to the account based, in part, on the second portion of the information related to the account from the RFID tag.

8. The system of claim 1, wherein the wearable mobile device is a watch comprising a computing device.

9. The system of claim 1, wherein the first frequency comprises one or more of a high frequency (HF) or an ultra-high frequency (UHF).

10. The system of claim 1, wherein the metal casing is configured to communicate via a second antenna and the second frequency, wherein the second frequency comprises an ultra-high frequency.

11. The system of claim 1, wherein the at least a first portion of the information related to the account identifies or links to account information of the account stored in a remote server.

12. A mobile device comprising:
a metal casing; and
a radio frequency identification (RFID) tag having a transponder comprising a plurality of antennas, wherein the metal casing comprises a body casing and wherein the body casing is at least one of the plurality of antennas is at least one of the plurality of antennas, the transponder configured to:
communicate via the plurality of antennas and corresponding plurality of frequencies, and
store information related to an account of a user of the mobile device,
wherein the RFID tag is configured to:
communicate at least a first portion of the related to the account and stored on the RFID tag to a first device using a first RFID reader included the first device operating at a first frequency of the plurality of frequencies, and
communicate at least a second portion of the information related to the account and stored on the RFID tag to a second device using a second RFID reader included the second device operating at a second frequency of the plurality of frequencies, and
wherein the mobile device is a wearable mobile device,
wherein the first device is configured to launch an application in response to receiving the at least the first portion of the information read from the RFID tag, the application comprising a plurality of instructions stored on a memory of the first device, the plurality of instructions causing a processor of the first device to access the account based on the first portion of the information related to the account and update an account balance of the account through interactions with a virtual wallet, and
wherein the second device is configured to apply a charge to the account based, in part, on the at least a second portion of the information related to the account.

13. The mobile device of claim 12, wherein the wearable mobile device is a watch comprising a computing device.

14. The mobile device of claim 12, wherein the first frequency comprises one or more of a high frequency (HF) or an ultra-high frequency (UHF).

15. The mobile device of claim 12, wherein the metal casing is configured to communicate via a second antenna and the second frequency, wherein the second frequency comprises an ultra-high frequency.

16. The mobile device of claim 12, wherein, based in part on communicating at least one of the first portion or second portion of the information related to the account, prompt a user to provide one or more forms of authentication credentials.

17. The mobile device of claim 16, wherein the mobile device is configured to:
prompt a user to provide one or more forms of authentication credentials, and
communicate the rest of the information stored on the RFID tag based on successfully authenticating the provided one or more forms of authentication credentials.

18. The mobile device of claim 12, wherein the mobile device comprises the functionality of one or more of a camera, credit card reader, audio speaker, or remote controller.

* * * * *